United States Patent
Gugel et al.

(10) Patent No.: US 10,099,736 B2
(45) Date of Patent: Oct. 16, 2018

(54) METHOD FOR CONTROLLING THE DRIVING OF A TRAILER OF A TRACTION VEHICLE-TRAILER COMBINATION

(71) Applicant: Deere & Company, Moline, IL (US)

(72) Inventors: Rainer Gugel, Plankstadt (DE); Barbara Böhm, Heidelberg (DE); Norbert Fritz, Ilvesheim (DE); Horst Wiedehage, Kirchheim Wstr. (DE)

(73) Assignee: Deere & Company, Moline, IL (US)

( * ) Notice: Subject to any disclaimer, the term of this patent is extended or adjusted under 35 U.S.C. 154(b) by 34 days.

(21) Appl. No.: 15/297,718

(22) Filed: Oct. 19, 2016

(65) Prior Publication Data

US 2017/0129558 A1 May 11, 2017

(30) Foreign Application Priority Data

Oct. 26, 2015 (EP) .................................. 15191456
Mar. 17, 2016 (EP) .................................. 16160944

(51) Int. Cl.
*B62D 59/02* (2006.01)
*B60L 9/00* (2006.01)
*B60K 6/52* (2007.10)
*B62D 59/04* (2006.01)
(Continued)

(52) U.S. Cl.
CPC ................ *B62D 59/02* (2013.01); *B60K 6/52* (2013.01); *B60L 9/00* (2013.01); *B60L 15/2045* (2013.01); *B60W 20/10* (2013.01); *B62D 59/04* (2013.01); *B60L 2200/28* (2013.01);
(Continued)

(58) Field of Classification Search
CPC .......... B62D 59/02; B62D 59/04; B60K 6/52; B60L 9/00; B60L 15/2045; B60L 2200/28; B60W 20/10; B60W 2300/14; B60W 2530/22; Y02T 10/7258
See application file for complete search history.

(56) References Cited

U.S. PATENT DOCUMENTS

| 4,976,331 A | 12/1990 | Noerens | |
|---|---|---|---|
| 2010/0114447 A1* | 5/2010 | Moriki | B60K 6/442 701/74 |

(Continued)

FOREIGN PATENT DOCUMENTS

| DE | 10131935 A1 | 3/2002 |
|---|---|---|
| DE | 102007051590 A1 | 4/2009 |
| EP | 1818245 A1 | 8/2007 |

(Continued)

OTHER PUBLICATIONS

European Search Report in foreign counterpart application No. 16160944.1 dated Mar. 23, 2017 (6 pages).

(Continued)

*Primary Examiner* — Aaron L Troost

(57) ABSTRACT

A method for controlling the driving of at least one drive axle on a trailer of a traction vehicle-trailer combination includes determining a target drive power for the drive axle of the trailer as a function of a distribution of contact forces on the trailer or on the traction vehicle, or as a function of a traction drive power for the traction vehicle. The method further includes providing drive control signals for controlling an electrical drive for the drive axle of the trailer. The drive control signals are derived from the determined target drive power.

9 Claims, 3 Drawing Sheets

(51) Int. Cl.
*B60W 20/10* (2016.01)
*B60L 15/20* (2006.01)

(52) U.S. Cl.
CPC ..... *B60W 2300/14* (2013.01); *B60W 2530/22* (2013.01); *Y02T 10/7258* (2013.01)

(56) References Cited

U.S. PATENT DOCUMENTS

2014/0278696 A1    9/2014  Anderson
2015/0053435 A1*   2/2015  Romig .................. B60L 11/08
                                                    172/3

FOREIGN PATENT DOCUMENTS

EP    2394889 A1     12/2011
GB    2516085 A  *   1/2015   ........... B60K 17/356

OTHER PUBLICATIONS

European Search Report in foreign counterpart application No. 15191456.1, dated Apr. 28, 2016 (6 pages).

* cited by examiner

METHOD FOR CONTROLLING THE DRIVING OF A TRAILER OF A TRACTION VEHICLE-TRAILER COMBINATION

RELATED APPLICATIONS

This application claims the benefit of EP application number 16160944.1, filed Mar. 17, 2016, and EP application number 15191456.1, filed Oct. 26, 2015, the disclosures of which are hereby expressly incorporated by reference in their entirety.

FIELD OF THE DISCLOSURE

The present disclosure relates to a method for controlling the driving of a trailer of a traction vehicle-trailer combination.

BACKGROUND

For traction vehicle-trailer combinations, there is often the challenge of not exceeding defined or legally prescribed limit weight values on the one hand but at the same time utilizing them as completely as possible. In this regard, a smaller traction vehicle can be used. There is a disadvantage in such a case, however, in that the assemblies relevant to drive power such as the engine and the transmission must be dimensioned smaller and only a correspondingly smaller drive power can be provided. If the traction vehicle weight is reduced, there is also the challenge of actually transferring the available drive torque (or drive power) to the road or the running surface, particularly under difficult driving conditions in the field. There is a need therefore of increasing the power density of a traction vehicle.

SUMMARY

In one embodiment of the present disclosure, a target drive power is determined for at least one drive axle, and possibly for multiple drive axles, of the trailer. This target drive power is to be determined depending on a distribution of contact forces for the trailer or for the traction vehicle, or depending on a traction drive power for the traction vehicle.

In this way a proportional allocation of the drive powers between the traction vehicle and the drive axle (or multiple drive axles) of the trailer is achieved. In particular, the allocation of the drive powers is proportional to the contact forces that are associated with the individual drive axles of the trailer or a trailer drawbar or the traction vehicle or the drive axles thereof.

Appropriate drive control signals are derived and provided from the determined target drive power for the drive axle. These drive control signals can control in a simple manner an electrical drive unit for the respective drive axle of the trailer (e.g. a control unit or an electric motor as a component of this electrical drive). The electrically driven drive axle of the trailer offers the advantage, in comparison to mechanically or hydraulically driven drive axles, in that it can be flexibly controlled by means of the drive control signals. The drive control signals can also be generated taking additional account of different constraints, defined criteria and physical parameters so that the electrically driven trailer axle can be controlled appropriately, depending on different driving, user or environmental conditions.

Overall, the method enables an intelligent allocation of the drive power to the traction vehicle and the trailer in such a manner that losses of drive power due to wheel slippage on the traction vehicle and or trailer are reduced. The control signals can be provided in such a manner that a minimum of drive power loss or wheel slippage occurs in the traction vehicle-trailer combination. In addition, this can achieve a drive torque or drive power transmitted to the surface being driven on that represents a maximum for the traction vehicle-trailer combination.

The traction drive power of the traction vehicle is considered to be the drive power present at or available to the drive train of the traction vehicle. In particular, the traction drive power is determined or calculated based on the engine power of the traction vehicle. It is possible to take account of various influences in this process such as parasitic power losses and power losses due to loads, especially hydraulic or electrical loads (e.g. main hydraulic pump, alternator, main fan, compressor for trailer braking, air conditioning compressor).

The contact force associated with the drive axle to be driven electrically can be available, for example, as data information on a data bus that is available in any case. Alternatively, this contact force can be calculated on the basis of a model or determined by appropriate measurements.

A control unit is provided for supplying the necessary control signals for activating the electrical drive of the trailer axle or axles in question. The electric current for electrically driving the respective drive axle of the trailer is generated by means of a generator gear unit which, for example, is a standard component of the traction vehicle (perhaps in connection with a power takeoff shaft) or is provided as a separate generator. The electrical drive usually contains an electrical machine (in particular an electric motor).

Since the respective drive axle of the trailer is electrically driven, the target drive power for this drive axle can also be referred to as electrical drive power. The trailer can have one wheel axle or multiple wheel axles. At least one wheel axle of the trailer is designed as an electrically driven drive axle. Multiple drive axles or all drive axles of the trailer are electrically driven. The trailer may be designed as a transport means for transporting goods or other loads. Alternatively, the trailer is designed as an attachment or implement for use in agriculture or street construction or maintenance, for example. The traction vehicle is an industrial utility vehicle or an agricultural utility vehicle, in particular a tractor.

In another embodiment, the target traction power for the respective drive axle of the trailer is determined by a traction drive power of the traction vehicle is determined, information representing the contact force at the drive axle of the trailer is provided, and information representing the sum of the contact forces at all drive axles of the traction vehicle is provided.

The target drive power can then be determined mathematically from the equation $$P\_ATj = P\_ZT * \frac{F\_Aj}{F\_ZA}$$

where P_ATj is the target drive power for the respective trailer axle to be driven electrically, P_ZT is the determined traction drive power of the traction vehicle, F_Aj is the contact force at the respective trailer drive axle to be driven electrically, and F_ZA is the sum of all the contact forces of the traction vehicle.

Based on this equation, little and relatively easily obtained information is required to determine the desired target drive power P_ATj for the electrically driven trailer axle. Depending on defined conditions, a contact force of a trailer drawbar can be associated either with the contact forces on the traction vehicle or considered as a contact force on the trailer. The sum of the contact forces at all drive axles of the traction vehicle (e.g. in the case of an all-wheel-drive with two vehicle axes) is likewise provided in a suitable manner as information. This information can be available, for example, as data information on a data bus that is present in any case.

Alternatively, the contact forces can be calculated on the basis of a model, estimated computationally or determined by appropriate measurements. Relevant status information (e.g. status of the all-wheel-drive) or known tare weight data of the traction vehicle or the trailer can also be taken into consideration. Contact forces are usually measured by pressure measurements at suitable points of the traction vehicle and the trailer (e.g. at the front axle suspension of the traction vehicle, at the drawbar suspension of the trailer).

In a further embodiment, multiple drive axles on the trailer are controlled in such a manner that the sum of the individual target traction powers for the individual drive axles is at most as large as an electrical power available, and the ratio of the individual target drive powers for the individual drive axles corresponds to the ratio of the contact forces associated with these individual drive axles. This guarantees that the determined target drive powers for the individual drive axles of the trailer are limited or reduced in a proportional relationship to one another if the sum of the determined target drive powers is greater than the instantaneously available electrical drive power for the trailer. This available electrical drive power can be different depending on different technical constraints and driving conditions.

Limiting the target drive power can also contribute depending on specific driving conditions to protecting the electrical drive against possible overloads and, for a specific energy distribution scheme, can ensure that other electrical loads are simultaneously also supplied with a defined electric power. The target drive power can be limited by suitable processing of the drive control signals, which control the electrical drive correspondingly.

The highest amount of power available for the electrical drive is defined automatically by a control system on the traction vehicle or trailer. Alternatively, this available electrical drive power can be predefined or updated on the user side.

In another embodiment, suitable drive torque control signals are derived from the drive control signals in order to control a drive torque at the electrically driven drive axle of the trailer. These drive torque control signals can advantageously be derived by taking into account wheel speeds of individual wheels of the traction vehicle or the trailer.

In particular, the drive torque control signals are processed in such a manner that they control the electrical driving of the trailer axle while maintaining defined driving conditions and thus contribute to an efficient driving and stable operation of the traction vehicle-trailer combination. These conditions define, for example, that a maximum transmittable drive torque at the drive axle of the trailer is not exceeded or a maximum drive force, dependent on the weight force of the traction vehicle, is not exceeded for the trailer, or a threshold value for a maximum drive force or drive power for the trailer defined (by a user or a control unit for example) is not exceeded.

In order to support a stable operation of the trailer, a wheel speed of the drive wheels of the drive axle for the trailer is determined and a speed threshold value for limiting the wheel slippage on these drive wheels is determined. The control signals for the electrical drive for the trailer axle can then be provided as a function of the determined speed threshold value.

The target drive power for the trailer axle to be driven electrically can be limited to an operationally stable amount in an energy-saving manner by actuating the electrical drive in the event of an increasing wheel speed at the drive axle of the trailer. This can be achieved as a function of the determined speed threshold value that when the speed threshold value is reached, the drive torque at this drive axle is reduced such that a further increase of the wheel speed is prevented.

The controlling of the drive axle disclosed herein is independent of a specific arrangement of this drive axle on the trailer and independent of the number of electrically driven axles on the trailer and also independent of the total number of all axles of the trailer. One electrical drive can be provided for each drive axle. Alternatively, one electrical drive can also drive multiple drive axles of the trailer. The same method principle with individual or all of the features explained herein can also be applied to control of one or more electrically driven drive axles of the traction vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
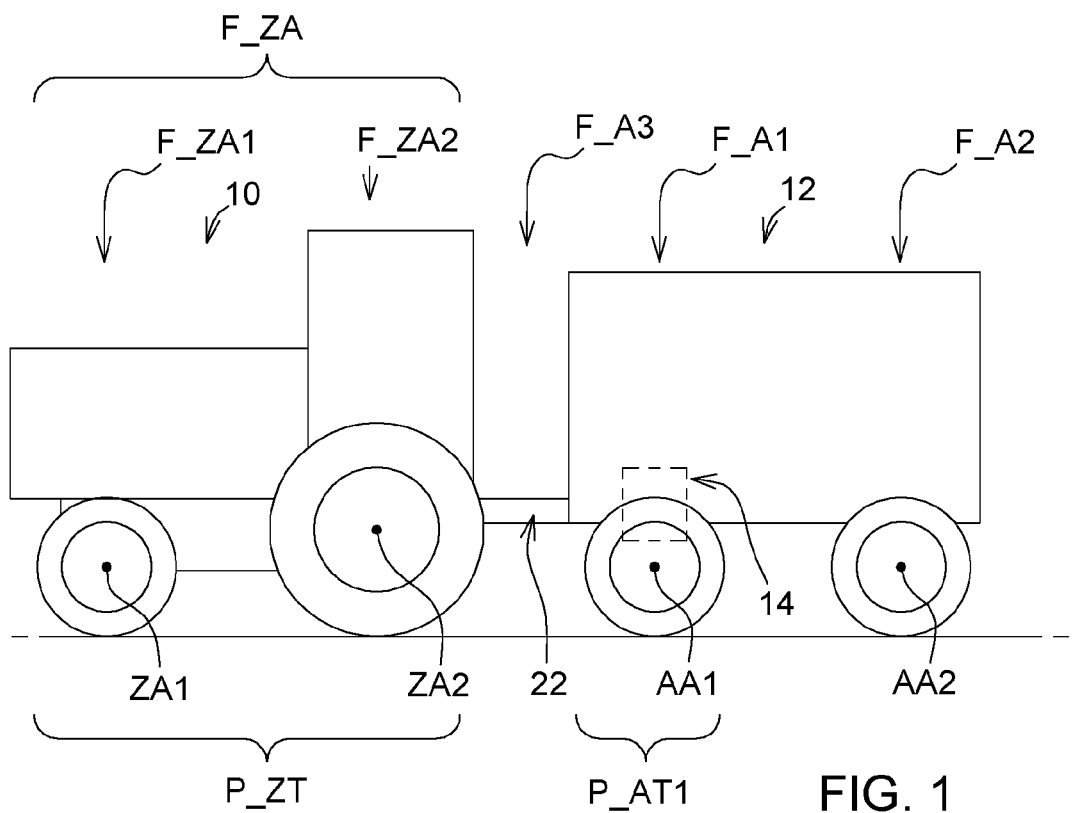
FIG. 1 is a schematic side view of a traction vehicle-trailer combination.

In a first embodiment, FIG. 1 shows a schematic view of a traction vehicle-trailer combination in the form of a tractor as the traction vehicle 10 and a trailer as a trailer 12 coupled thereto. The traction vehicle 10 has two drive axles, namely a front drive axle ZA1 and a rear drive axle ZA2. The traction vehicle 10 consequently has an all-wheel drive system. The rear drive axle ZA2 is driven constantly, while the front axle ZA1 is connected to a shiftable drive and therefore driven as needed. A contact force F_ZA1 is associated with the first drive axle ZA1 and a contact force F_ZA2 is associated with the second drive axle ZA2. The sum of all contact forces of the traction vehicle 10 is designated F_ZA. A drive power P_ZT is provided for the traction vehicle 10 as a whole at the drive train thereof. This traction drive power P_ZT can be present at the drive axle ZA2 or can be distributed to both drive axles ZA1 and ZA2.

The trailer 12 has an electrically driven drive axle AA1 and a second trailer axle AA2. An electrical drive 14 is available for electrically driving the drive axle AA1. The electrical drive 14 is controlled by a control unit 16, schematically illustrated in FIG. 2, which is integrated on the traction vehicle 10, for example, on the trailer 12 or directly at the electrical drive 14. A contact force F_A1 is associated with the electrically driven drive axle AA1 and a contact force F_A2 is associated with the second drive axle AA2. A contact force F_A3 is also associated with a trailer drawbar 7. The target drive power determined for drive axle AA1 is designated P_AT1.

Figure 2:
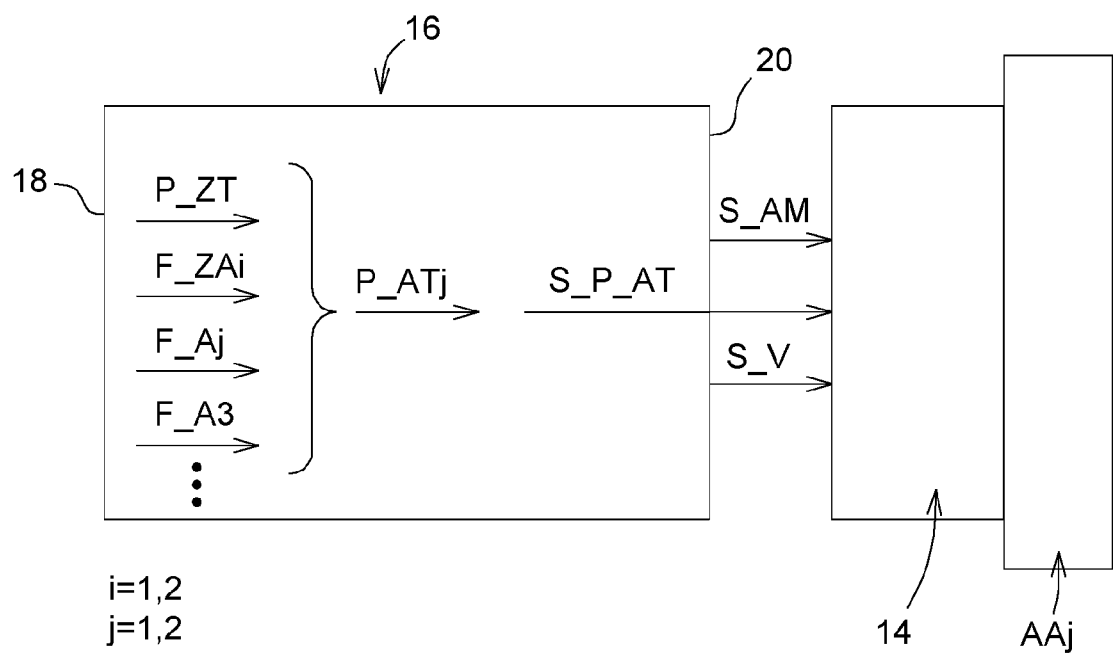
FIG. 2 is a schematic representation of a control unit with control signals for an electrical drive of one or more electrically driven trailer axles.

According to FIG. 2, the control unit 16 has at its disposal the drive power P_ZT, the contact forces F_ZAi (with i=1, 2) of the traction vehicle 1 and at least the contact forces F_A1 and F_A3 of the trailer 2, in addition to other possible data information or input signals. The contact forces F_ZAi of the traction vehicle 1 can alternatively be replaced under special constraints approximately by the weight force of the traction vehicle. The data information or input signals are available in part or in full either already at a signal input 18 of the control unit 16 or are calculated in the control unit 16.

A target drive power P_ATj, optimized in terms of driving technology, for an electrically driven drive axle AAj is determined in the control unit 16. Therefore, a target drive power P_AT1 for the drive axle AA1 is determined in the example according to FIG. 1. Appropriate drive control signals S_P_AT for controlling the electrical drive 14 are derived by calculation from the determined target drive power P_ATj. These drive control signals S_P_AT are used either for direct control of the electrical drive 14, or are first further processed in the control unit 16. Thus, for example, drive torque control signals S_AM can be derived from the drive control signals S_P_AT. Signals from different sensors (e.g. wheel speeds of driven or non-driven wheels on the traction vehicle or trailer, travel speed of the traction vehicle or the trailer, drawbar angle, steering angle of the traction vehicle wheels, curvature of the traction vehicle path, GPS signals) of the traction vehicle 10 or the trailer 12 can be taken into consideration. At output 20, the control unit 16 can also provide speed control signals S_V for the electrical drive 14.

A speed threshold value for limiting wheel slippage on the drive wheels of the drive axle AA1 is also determined in the control unit 16, so that the electrical drive 14 can be controlled as a function of the determined speed threshold. If the wheel speed increases and the speed threshold value is reached, the control unit 16 reduces the drive torque by means of the drive torque control signals S_AM such that a further increase of wheel speed is avoided.

The method enables a proportional distribution of the drive power between the drive train of the traction vehicle 10 and the electrical drive 14 of the trailer 12, corresponding to the ratio of the determined contact forces, in particular the contact forces F_ZA, F_A1 and F_A3, to one another. A target drive power P_ATj for an electrically driven drive axle AAj is determined on the basis of the consideration that it should be proportional as much as possible to the drive power P_ZT of the traction vehicle 1. In addition, the target drive power is P_ATj should be dimensioned as proportionally as possible to the contact force F_Aj at the drive axle AAj in question. This consideration is expressed in equation (1):

$$\frac{F\_Aj}{\Sigma_j F\_Aj + F\_ZA} = \frac{P\_ATj}{\Sigma_j P\_ATj + P\_ZT} \quad (1)$$

The sum of the contact forces F_Aj and the sum of the target drive forces P_ATj takes account of the fact that an arbitrary number of electrically driven trailer axles AAj can be provided, so that the variable "j" can correspond to any desired natural number. Based on the example according to FIG. 1, the trailer axle AA2 in an additional embodiment can also be electrically driven (j=1, 2). In addition, the contact force F_A3 associated with the trailer drawbar 7 can also enter into the sum of the contact forces F_Aj of the electrically driven trailer axles AAj. In the right-hand part of equation (1), the sum can be defined or determined or estimated from the target drive powers P_ATj and the drive power P_ZT of the traction vehicle 10, by proceeding from an engine power of the traction vehicle 10 and deducting determined or estimated power losses (e.g. due to the transmission or due to loads) on the traction vehicle 10 or trailer 12.

Equation (1) can be further simplified by equation (2) for an algorithm, so that no additional data from the other axles of the trailer 12 are required:

$$P\_ATj = P\_ZT * \frac{F\_Aj}{F\_ZA} \quad (2)$$

In one embodiment, the electrical drive 14 can be associated with only one trailer axle AAj, e.g., trailer axle AA1. In other embodiments, a single electrical drive 14 can drive multiple trailer axles AAj.

A method based on the above-mentioned considerations makes it possible to reduce or minimize drive slippage and a corresponding loss of drive power of the traction vehicle-trailer combination.

Figure 3:
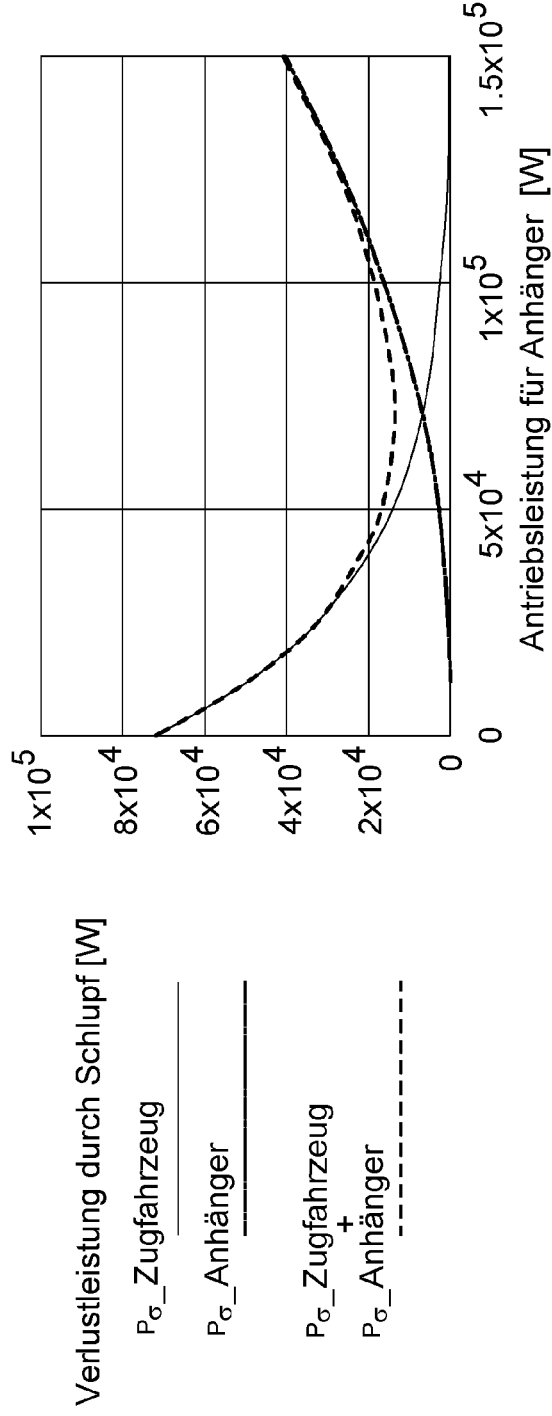
FIG. 3 is a diagram representing a power loss for the traction vehicle and the trailer as a function of the drive power for the trailer.

The diagram according to FIG. 3 shows an example of the loss of power due to slippage on the traction vehicle 10 as a function of the drive power provided for the trailer 12. The intersection point of the ordinate (y-axis) and the abscissa (x-axis) corresponds to a state of the trailer 12 without drive power, i.e. the trailer 12 is only pulled by the traction vehicle 10 and is not additionally driven. The power loss due to slippage in this state is approximately 72 kW for the traction vehicle 10. The same power loss applies to the combination of traction vehicle 10 and trailer 12. The loss of power of the traction vehicle 10 decreases with increasing drive power for the trailer 12. The loss of power of the trailer increases 12 with increasing drive power at the axle AA1 or axles thereof. The sum of the power losses of the traction vehicle 10 and the trailer 12 is shown by the curve in dash lines, which reaches an absolute minimum at a defined distribution of the total drive power to the traction vehicle 10 and the trailer 12. Consequently, approximately 60 kW of lost power can be saved if a determined target drive power, corresponding to the aforementioned minimum along the abscissa, i.e., approximately 72 kW, is provided for the trailer 12.

Figure 4:
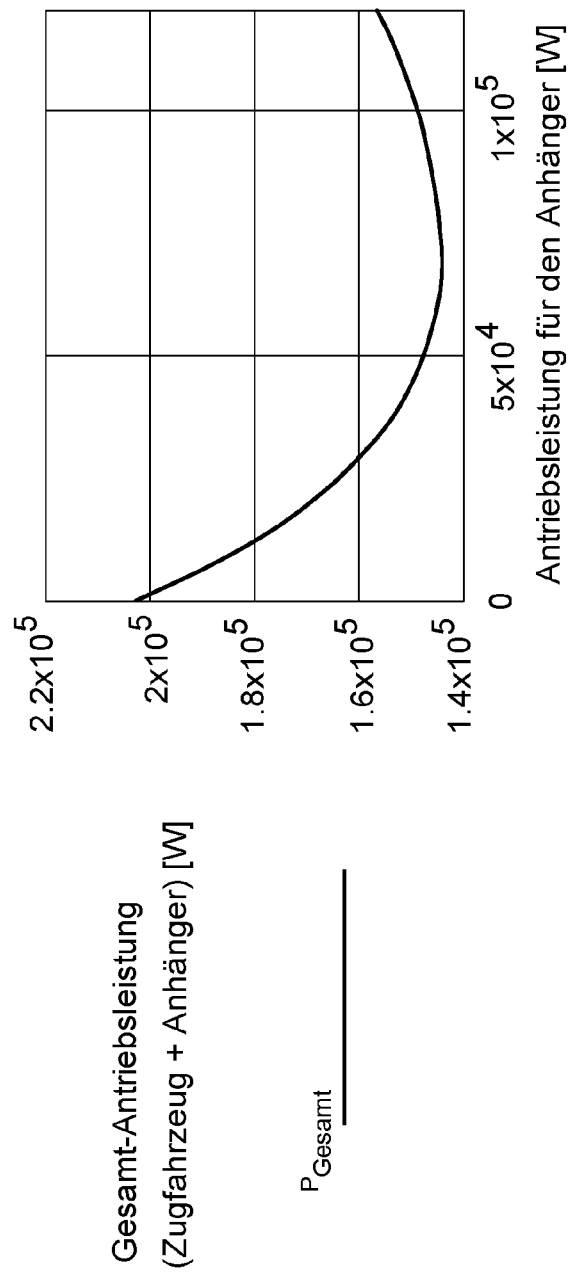
FIG. 4 is a diagram representing a total drive power of a traction vehicle-trailer combination as a function of a drive power for the trailer.

Due to the 60 kW of saved power, the required overall drive power in this example decreases, i.e., for traction vehicle 10 and trailer 12, from approximately 202 kW to approximately 142 kW. This is recognizable from the ordinate of the diagram according to FIG. 4. The 142 kW correspond to an absolute minimum of the illustrated overall power balance curve. This curve again shows that a proportional drive power of approximately 72 kW for the trailer 12 is necessary to minimize the loss of power of the traction vehicle-trailer combination due to slippage. The traction vehicle 10 then requires only 70 kW (=142 kW-72 kW) of drive power. As is recognizable along the ordinate, the same traction vehicle-trailer combination, without any drive power for the trailer, would require 202 kW of drive power, which would then be associated only with the traction vehicle 10. On the other hand, the control strategy of using an additional electrical drive on the trailer in order to minimize the total power loss makes it possible for the traction vehicle 10 to be driven with only approximate 70 kW and thus approximately 132 kW (=202 kW-70 kW) drive power can be saved for the traction vehicle 10.

Figure 5:
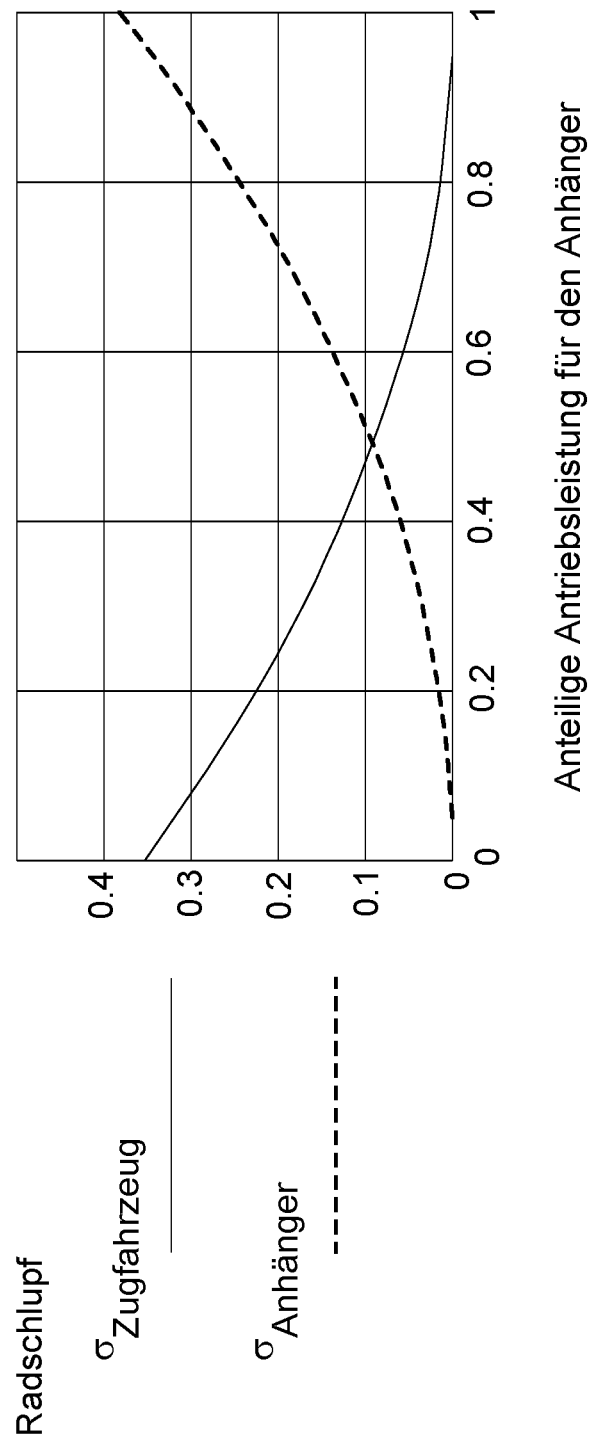
FIG. 5 is a diagram representing the wheel slippage on a traction vehicle and a trailer as a function of the proportional drive power for the trailer.

The diagram according to FIG. 5 shows the proportional drive power for the trailer 12 along the abscissa. The proportion "0" means that no drive power is provided to the trailer 12; the trailer is then merely pulled. The proportion "1" means that drive power is provided only at the trailer 12 and not at the traction vehicle 10. With increasing proportional drive power for the trailer 12, the wheel slippage on the traction vehicle 10 (solid-line curve) decreases and the wheel slippage on the trailer 12 (dash-line curve) increases.

As already mentioned, the presented method offers a control strategy for reducing or minimizing the wheel slippage and thus also the power loss of the traction vehicle-trailer combination. One example proposes a proportional allocation of the total drive power to the traction vehicle and the axle AA1 of the trailer 12.

In this example, the weight of the trailer 12 is approximately 32.8 tons. The weight of the traction vehicle 10 is approximately 7.2 tons. The traction vehicle, or the traction vehicle-trailer combination, is traveling at a speed of 10 km/h, the traction vehicle 10 being equipped with an all-wheel-drive. The contact force F_A1 on the driven trailer axle AA1 is 10.3 tons and the contact force F_A3 on the trailer drawbar 7 is 3.5 tons. Thus the force ratios according to equation (1) are: 10.3 t/(10.3+3.5+7.2) t=0.49. According to equation (1), approximately 49% of the total drive power for the traction vehicle-trailer combination should be proportionally provided to the drive axle AA1 of the trailer 12.

With the aid of the presented method, trailers 12 can be stably towed even by traction vehicles 10 that are dimensioned substantially more lightly in terms of drive technology and conventionally would not be suitable for pulling such a trailer.

Structural units or modules for increasing power (e.g., generators) can be efficiently integrated into traction vehicles that, based on their small size, are conventionally conceived only for relatively low drive forces or drive powers with a correspondingly "weaker" drive engine. The illustrated method now makes it possible to equip the same "weaker" traction vehicle with a more powerful drive engine and to be able to transmit the larger drive forces or drive torques provided by means of the traction vehicle and the trailer to the road. A more powerful drive engine of the traction vehicle is used to output a part of the power thereof to a drive for the trailer.

In particular, a part of the power from the drive engine of the traction vehicle is output to the above-mentioned power-increasing module, which can convert the mechanical power drawn from the drive engine into electrical power and then provide the power to at least one electrical drive for one or more electrically driven trailer axle(s).

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling the driving of at least one drive axle on a trailer of a traction vehicle-trailer combination, comprising:
   determining a traction drive power for a traction vehicle;
   providing information representing a contact force at the drive axle of the trailer;
   providing information representing a sum of the contact forces at all drive axles of the traction vehicle;
   determining a target drive power for the drive axle of the trailer as a function of a distribution of contact forces on the trailer and on a traction vehicle, and as a function of the traction drive power for the traction vehicle; and
   providing drive control signals for controlling an electrical drive for the drive axle of the trailer;
   wherein, the drive control signals are derived from the determined target drive power;
   wherein, the target drive power for the drive axle of the trailer is based on a ratio of the traction drive power of the traction vehicle, the contact force at the drive axle of the trailer, and the sum of the contact forces at all drive axles of the traction vehicle.

2. A method for controlling the driving of drive axles on a trailer of a traction vehicle-trailer combination, comprising:
   determining an individual target drive power for each individual drive axle of the trailer as a function of a distribution of contact forces on the trailer or on the traction vehicle, or as a function of a traction drive power for the traction vehicle; and
   providing drive control signals for controlling an electrical drive for the drive axle of the trailer;
   wherein, the drive control signals are derived from the determined target drive power;
   wherein, the drive axles on the trailer are controlled by means of drive control signals in such a manner that a sum of the individual target drive powers for the individual drive axles is at most as large as an available electrical power, and a ratio of the individual target drive powers for the individual drive axles corresponds to a ratio of the contact forces associated with these individual drive axles.

3. The method of claim 1, wherein drive torque control signals are derived from the drive control signals in order to control a drive torque at the drive axle of the trailer.

4. The method of claim 3, wherein the drive torque control signals are derived as a function of wheel speeds of individual wheels of the traction vehicle or trailer.

5. The method of claim 3, further comprising processing the drive torque control signals such that a maximum transmittable drive torque at the drive axle of the trailer is not exceeded, a maximum drive force based on a weight force of the traction vehicle is not exceeded for the trailer, or a defined threshold value for a maximum drive power or drive force for the trailer is not exceeded.

6. The method of claim 1, further comprising:
   determining a wheel speed associated with the drive wheels of the drive axle of the trailer;
   determining a speed threshold value for limiting the wheel slippage on these drive wheels; and controlling the electrical drive of the drive axle based on the determined speed threshold value.

7. The method of claim 6, wherein:
the electrical drive of the drive axle is controlled depending on the determined speed threshold value if the wheel speed is increasing; and
the drive torque at this drive axle is reduced such that a further increase of the wheel speed is avoided if the threshold speed value is reached.

8. The method of claim 1, wherein multiple drive axles of the trailer are driven by means of the electrical drive.

9. The method of claim 2, wherein the electrical power available is predefined.

* * * * *